(12) United States Patent
Ramamurthy et al.

(10) Patent No.: US 9,793,819 B2
(45) Date of Patent: Oct. 17, 2017

(54) METHODS AND APPARATUS OF CONTROLLERS FOR POWER CONVERTER WITH PARALLEL POWER CHANNELS HAVING INDEPENDENT DC BUSES

(71) Applicant: GE Energy Power Conversion Technology Ltd, Rugby, Warwickshire (GB)

(72) Inventors: Shyam Sunder Ramamurthy, Pittsburgh, PA (US); Luke Anthony Solomon, Pittsburgh, PA (US); Brian Babes Venus, Reinholds, PA (US); Christopher Joseph Lee, Pittsburgh, PA (US)

(73) Assignee: GE ENERGY POWER CONVERSION TECHNOLOGY LTD (GB)

( * ) Notice: Subject to any disclaimer, the term of this patent is extended or adjusted under 35 U.S.C. 154(b) by 0 days.

(21) Appl. No.: 14/959,062

(22) Filed: Dec. 4, 2015

(65) Prior Publication Data

US 2017/0163165 A1 Jun. 8, 2017

(51) Int. Cl.
*H02M 5/458* (2006.01)

(52) U.S. Cl.
CPC .................. *H02M 5/458* (2013.01)

(58) Field of Classification Search
CPC .. H02M 5/458; H02M 2001/123; H02M 1/12; H02M 7/49
See application file for complete search history.

(56) References Cited

U.S. PATENT DOCUMENTS

| 3,823,327 | A | * | 7/1974 | Bayer | H02J 3/06 307/58 |
| 5,521,809 | A | * | 5/1996 | Ashley | H02J 1/10 307/82 |
| 5,943,229 | A | | 8/1999 | Sudhoff | |
| 6,157,555 | A | * | 12/2000 | Hemena | H02J 1/10 307/55 |
| 7,439,714 | B2 | | 10/2008 | Llorente Gonzalez et al. | |
| 2011/0155703 | A1 | * | 6/2011 | Winn | B23K 9/1075 219/121.54 |
| 2013/0154585 | A1 | * | 6/2013 | Laur | H02M 3/1584 323/237 |

(Continued)

*Primary Examiner* — Adolf Berhane
*Assistant Examiner* — Bart Iliya
(74) *Attorney, Agent, or Firm* — GE Global Patent Operation; Scott R. Stanley

(57) ABSTRACT

Certain embodiments of the present invention relates to a method for controlling operation of a parallel converter system. The parallel converter system includes multiple parallel power converters, and each of the parallel power converters is coupleable to a corresponding controller. The method includes: generating, via each of the controllers, a channel reference signal, transmitting each of the generated channel reference signals to a corresponding one of the parallel power converters, and adjusting an output current of each of the parallel converters responsive to the corresponding channel reference signals received, the adjusting controlling a combined output current of the parallel converter system. The channel reference signals of these parallel power converters are generated in response to the participation factors of each of the parallel power converters, and a net converter output reference current.

11 Claims, 6 Drawing Sheets

(56) References Cited

U.S. PATENT DOCUMENTS

2013/0241451 A1* 9/2013 Wei .................. H02P 27/06
318/400.3
2016/0118789 A1* 4/2016 Fornage .................. H02J 3/00
307/52

* cited by examiner

METHODS AND APPARATUS OF CONTROLLERS FOR POWER CONVERTER WITH PARALLEL POWER CHANNELS HAVING INDEPENDENT DC BUSES

FIELD OF THE INVENTION

The present disclosure relates to the field of power conversion systems, and particularly to controllers for power converters with parallel power channels having independent direct current (DC) buses.

BACKGROUND OF THE INVENTION

Power conversion systems play a significant role in converting energy produced by alternate energy sources, such as photovoltaic (PV) arrays and wind converters, into an optimized power form for supply to the electric grid or for conditioning power from the grid for driving a load. Insulated-gate bipolar transistor (IGBT) inverters, which include metal-oxide-semiconductor field-effect transistor (MOSFET) devices, are often essential components in any power conversion system. In these power conversion systems, IGBT control is critical to optimizing output power.

Power conversion systems are used to generate desired output alternate current (AC) output to a load or supply generated electricity to a utility grid. Certain power conversion systems include a single channel converter and inverter combo power module. A converter module of the single channel converter and inverter combo power module converts input AC current to DC current, and an inverter module of the single channel converter and inverter combo power module converts the DC current back to AC current for output to the load or the utility grid.

Multiple single channel converter and inverter combo power modules can be used to convert multiple phase AC current. Multiple single channel converter and inverter combo power modules can be combined in parallel to form a parallel converter system. The parallel converter system shares the electricity from each individual channel to increase the overall power output of the power conversion system and optimize the power efficiency of the power conversion system.

Each individual channel in the parallel converter system has provisions so that it can be turned on or off independently. However, as one of the channels in the parallel converter system is turned on or off when all the channels are sharing the output equally, such action may cause a shock to the parallel converter system as well as the output load. Hence, it is necessary to increase or decrease the participation of a channel in supplying the total output gradually when switching, thereby requiring that a given power channel be capable of supplying a portion of the total output other than what it would be when the parallel channels are sharing exactly equally. Such a capability is also useful when it is necessary to reduce the output of a channel and increase the output of another channel due to reduction in available channel cooling capability.

Furthermore, it is also essential to realize identical common mode voltages at the output of all parallel channels in a converter, irrespective of its main output voltage to prevent circulation of common mode currents among the parallel channels in the power converter.

SUMMARY OF THE EMBODIMENTS

Given the aforementioned deficiencies, a need exists for methods and systems to more precisely control the combined output current of a parallel converter system.

Under certain circumstances, embodiments of the present invention provide a method for controlling operation of a power converter system including multiple parallel power channels, each being coupleable to a controller. The method includes generating, via each of the controllers, a reference signal and transmitting each of the reference signals to a corresponding one of the parallel converters. An output current of each of the parallel channels is adjusted responsive to the corresponding reference signals received, the adjusting controlling a combined output current of the converter system.

These and other aspects of the present disclosure will become apparent from following description of the embodiments taken in conjunction with the following drawings and their captions, although variations and modification therein may be affected without departing from the spirit and scope of the novel concepts of the disclosure.

BRIEF DESCRIPTION OF THE DRAWINGS

The present disclosure is illustrated in the accompanying drawings, throughout which, like reference numerals may indicate corresponding or similar parts in the various figures. The drawings are only for purposes of illustrating preferred embodiments and are not to be construed as limiting the invention. Given the following enabling description of the drawings, the novel aspects of the present disclosure should become evident to a person of ordinary skill in the art.

DETAILED DESCRIPTION

Figure 1:
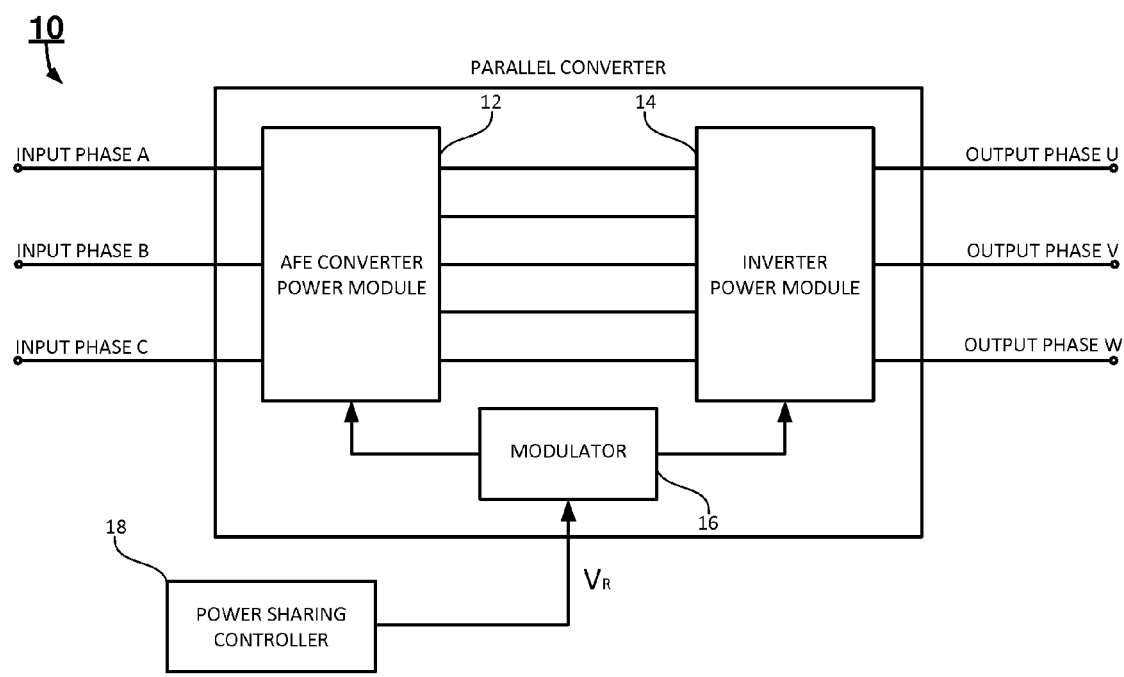
FIG. 1 is a block diagram of a channel in the power converter in accordance with certain embodiments of the present invention.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In various embodiments, multi-level power conversion is achieved in a manner that provides higher power quality and density than conventional approaches at lower costs. In one embodiment, a multi-level (e.g., three levels) inverter is provided to achieve the multiple output voltage levels. Control signals, output from a controller, selectively activate/deactivate internal converter components to control the voltage output levels—increasing the levels to five, seven, nine, eleven, or more.

In these multi-level structures, switches devices, DC link capacitors, and other internal components, can be configured to operate in a cascading manner to produce the required multiple output levels. The controller can be configured to control operation of the switch elements—activating (turning on) and deactivating (turning off) power switches within the switch elements, one at a time. Activating and deactivating the power switches enables precise control of the voltage levels output from the converter.

Inverters are utilized in applications requiring direct conversion of electrical energy from DC to AC or indirect conversion from AC to AC. DC to AC conversion is useful for many fields, including power conditioning, harmonic compensation, motor drives, and renewable energy grid-integration. The DC to AC power conversion is the result of power switching devices, which are commonly fully controllable semiconductor power switches.

Output waveforms produced by semiconductor power switches are made up of discrete values, producing fast transitions rather than smooth ones. The ability to produce near sinusoidal waveforms around the fundamental frequency is dictated by the modulation technique controlling when, and for how long, the power valves are on and off. Common modulation techniques include the carrier-based technique, or pulse width modulation (PWM), space-vector technique, and the selective-harmonic technique.

Power conversion system are used to generate desired output AC output to a load or supply generated electricity to a utility grid. Certain power conversion systems include a single channel converter and inverter combo power module. A converter module of the single channel converter and inverter combo power module converts input AC current to DC current, and an inverter module of the single channel converter and inverter combo power module converts the DC current back to AC current for output to the load or the utility grid. Multiple single channel converter and inverter combo power module can be used to convert multiple phase AC current. Multiple single channel converter and inverter combo power module can be combined in parallel to form a parallel converter system. The parallel converter system shares the electricity from each individual channel to increase the overall power output of the power conversion system and optimize the power efficiency of the power conversion system.

Each individual channel in the parallel converter system can be turned on or off independently while it is still carrying its own share of the load current. However, when one of the individual channel in the parallel converter system is turned on or off, such action may cause a shock to the parallel convert system. Therefore, it is desirable to control the output current of the parallel converter system to reduce the current in one channel while increasing the current in other channels, to limit and reduce the disturbances and the shocks to the parallel converter system. When each channel is carrying a different proportion of the output current, the voltage at the output of each channel will be different due to loading differences in addition to the already existing difference due to component tolerances. However, the common voltage output of all the channels needs to be the same to avoid circulation of common mode currents in solidly grounded transformer-less systems.

In one aspect, the present invention relates to a parallel converter system. The parallel converter system has N parallel power channels $PPC_K$, where K=1, 2, . . . , and N. FIG. 1 shows a block diagram of a channel K parallel converter 10 which is channel K of the parallel converter system. In certain embodiments, the channel K parallel convert 10 includes: a channel K active front end (AFE) converter power module 12, a channel K inverter power module 14, and a channel K modulator 16.

The channel K AFE converter power module 12 is configured to receive one or more phases of AC inputs of the channel, and converts the AC inputs to one or more DC outputs of the channel K (conversion process). In the embodiment as shown in FIG. 1, the AC inputs have three input phases: input phase A, input phase B, and input phase C. The channel K inverter power module 14 receives the one or more DC outputs of the channel K from the channel K AFE converter power module 12 and provides one or more phases of AC outputs of the channel K (inversion process). As shown in FIG. 1, the three output phases are output phase U, output phase V, and output phase W. In other parallel converter systems, the number of input and output phases can be different.

The channel K modulator 16 is designed to control the conversion and the inversion of the channel K parallel converter according to a channel K reference signal $V_{RK}$ received from a channel K power sharing controller 18. In one embodiment, the channel K modulator 16 produces a control signal to the channel K AFE converter power module 12 to control the conversion process. In another embodiment, the channel K modulator 16 produces another control signal to the channel K inverter power module 14 to control the inversion process. In yet another embodiment, the channel K modulator 16 produces control signals to control both the conversion process and the inversion process. These control signals from the channel K modulator 16 are responsive to the channel K reference signal $V_{RK}$ received.

Figure 2:
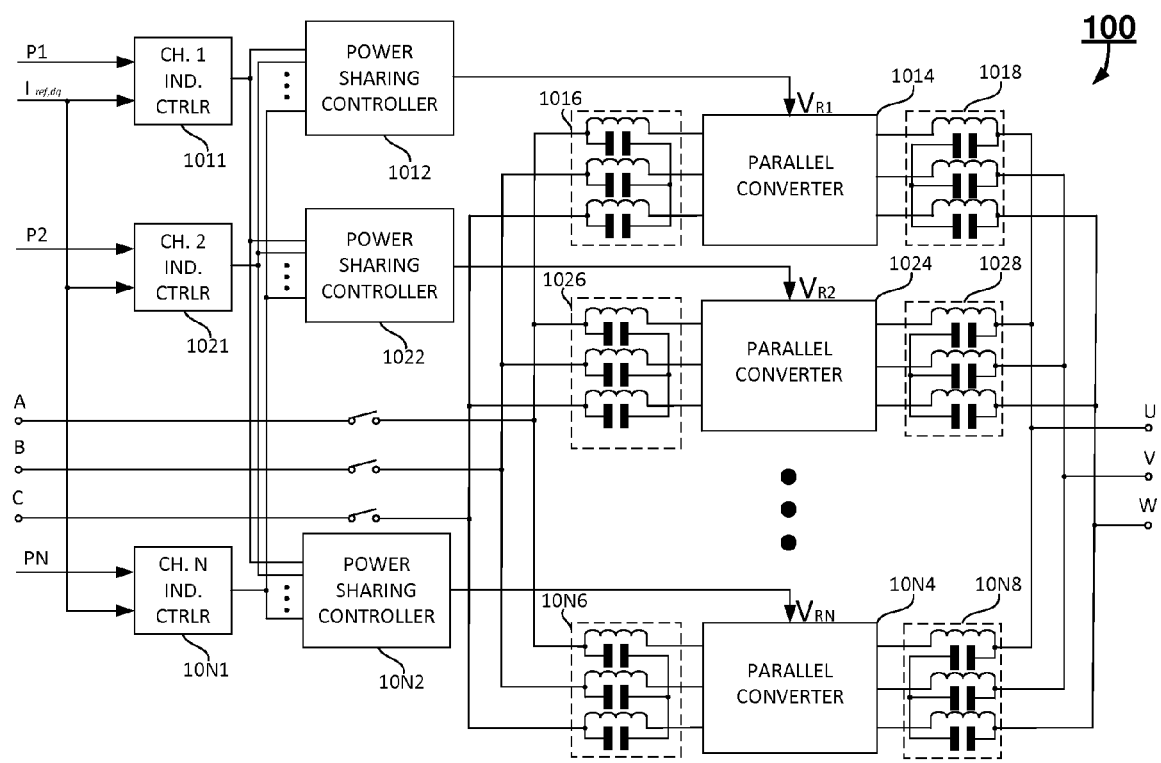
FIG. 2 is a block diagram illustration of the general topology of a power converter system having a channel individual controller for each channel in accordance with certain embodiments of the present invention.

FIG. 2 is a block diagram illustration of the general topology of a parallel converter system 100 in accordance certain embodiments of the present invention. In certain embodiments, the parallel converter system 100 has N parallel power channels $PPC_K$ 10K, where K=1, 2, . . . , and N. As shown in FIG. 2, the parallel converter system 100 has: N channel power sharing controllers: a channel 1 power sharing controller 1012, a channel 2 power sharing controller 1022, . . . , and a channel N power sharing controller 10N2, and N channel parallel converters: a channel 1 parallel converter 1014, a channel 2 parallel converter 1024, . . . , and a channel N parallel converter 10N4. Each of the channel power sharing controllers is coupled to a corresponding channel parallel converter.

In certain embodiments, each of the channel power sharing controllers provides a channel reference signal $V_{RK}$ to the corresponding channel K parallel converter to control the output of the channel K independently such that the sum of the output current of the parallel converter system is precisely controlled, short circuit currents from the channel parallel converters are limited, and shocks on the parallel converter system caused by the fluctuation of the output current are reduced.

In the AC input end, the parallel converter system 100 has N input filter combo units: a channel 1 input filter combo 1016, a channel 2 input filter combo 1026, . . . , and a channel N input filter combo 10N6. Each of the input phase has a filter, where an inductor is coupled in serial and a capacitor is coupled in parallel to stabilize the impedance of the corresponding input phase. In the AC output end, the parallel converter system 100 has N output filter combo units: a channel 1 output filter combo 1018, a channel 2 output filter combo 1028, . . . , and a channel N output filter combo 10N8. Each of the output phase also has a filter, where an inductor is coupled in serial and a capacitor is coupled in parallel to smooth out the output AC waveform.

In certain embodiments, as shown in FIG. 2, the parallel converter system 100 has N channel individual controllers: a channel 1 individual controller 1011, a channel 2 individual controller 1021, . . . , and a channel N individual controller 10N1 each receiving the net converter output reference current $I_{ref,dq}$ along the d and q axis representing the reactive and active components respectively and channel participating factors $P_K$ dictating the participation of each channel in the net output. Note that the participation of channel J in the output current would be the proportion $$\frac{P_J}{\Sigma_1^N P_K} \times I_{ref,dq}$$

and 1≤J≤N. Each of the channel individual controllers is coupled to each of the channel power sharing controllers. Each of the channel power sharing controllers receives input voltages from each of the channel individual controllers. Each of the input voltages from the channel individual controller is responsive to the current measurement of each of the channel parallel converters.

In one embodiment, each of the channel individual controllers is connected to the AC input end to provide an input current measurement of each of the channel parallel converters, independently. In another embodiment, each of the channel individual controllers is connected to the AC output end to provide an output current measurement of each of the channel parallel converters, independently. These input or output current measurements are used to track the current fluctuations in each channel parallel converter independently, and the collection of these current measurements are used to control each of the channel parallel converters to obtain desired output current of the parallel converter system 100.

Figure 3:
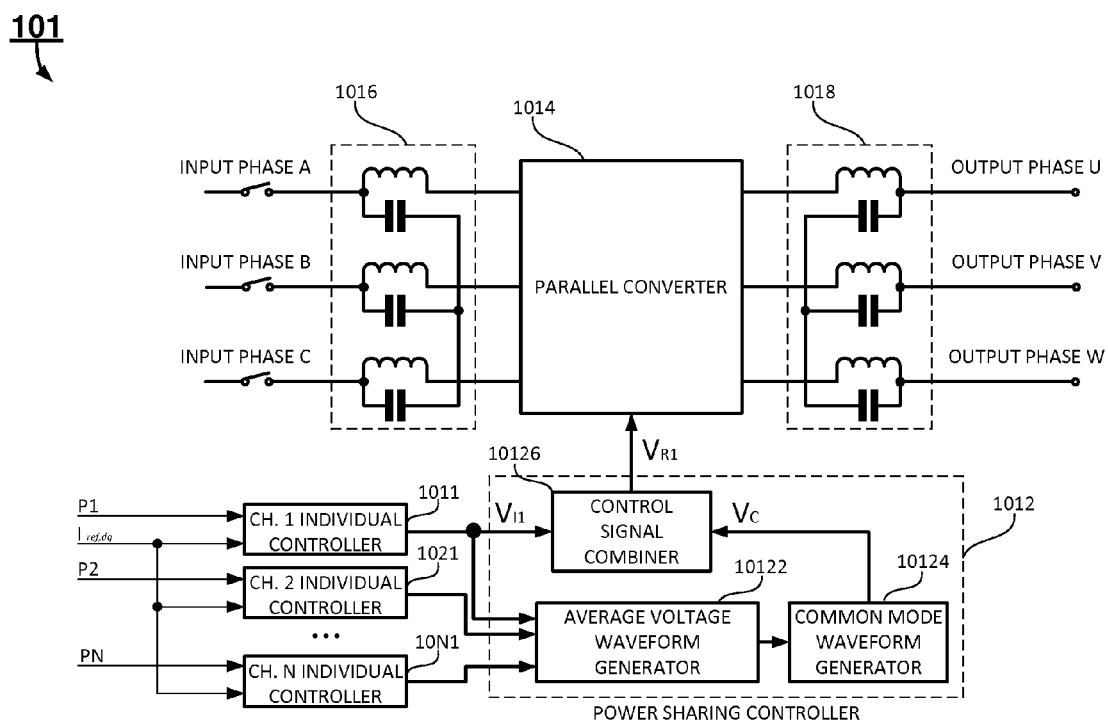
FIG. 3 is a detailed block diagram illustration of the channel one of the parallel converter system with channel individual controllers in which embodiments of the present invention can be practiced.

FIG. 3 is a detailed block diagram illustration of the channel one of the parallel converter system 101 in which embodiments of the present invention can be practiced. In certain embodiments, the channel 1 power sharing controller 1012 has an average voltage waveform generator 10122, a common mode waveform generator 10124, and a control signal combiner 10126. The average voltage waveform generator 10122 receives the input voltages from each of the N channel individual controllers and generates a channel average voltage waveform signal in response to the input voltages received. The common mode waveform generator 10124 receives the channel average voltage waveform signal and generates a channel common mode waveform signal $V_C$ according to the channel average voltage waveform signal received.

The control signal combiner 10126 receives an input voltage $V_{I1}$ (input voltage 1) from the channel 1 individual controller 1011, and the channel common mode waveform signal $V_C$ from the common mode waveform generator 10124, and combines the input voltage $V_{I1}$ from the channel 1 individual controller and the channel common mode waveform signal $V_C$ from the common mode waveform generator 10124 to generate the channel 1 reference signal $V_{R1}$.

Other channels of parallel converter system 100 are operated in a similar manner except that the control signal combiner of channel K receives the input voltage $V_{I1}$ (from the corresponding channel K individual controller 10K1. The channel K reference signal $V_{RK}$ is the combination of $V_{IK}$ and $V_C$. While $V_{RK}$ may be different for each channel K individual controller 10K1, the channel common mode waveform signal $V_C$ will be the same for each of the channel power sharing controller 10K2 because the channel common mode waveform signal is based on the average voltage waveforms of the input voltages of the N channel individual controllers.

In certain embodiments, each of the channel reference signals $V_{RK}$, where K=1, 2, . . . , and N, is user programmable via the average voltage waveform generator 10122 and the common mode waveform generator 10124.

Figure 4:
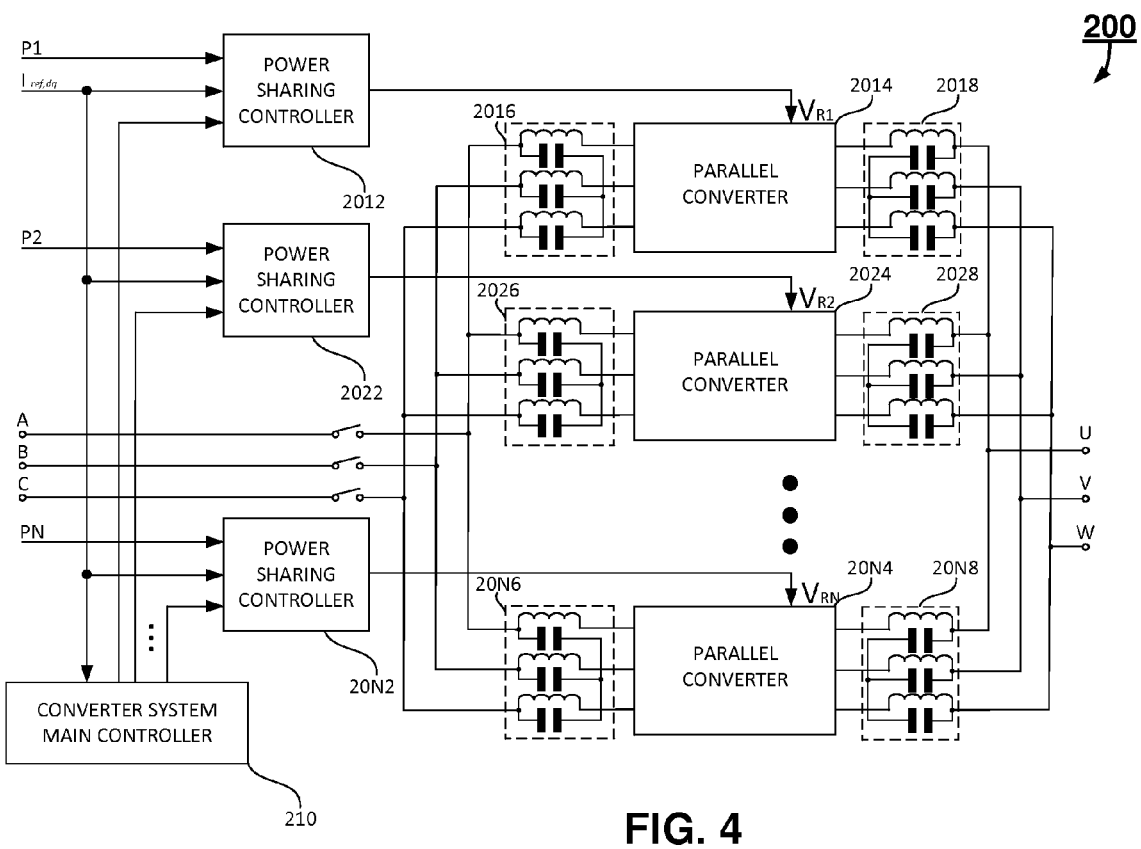
FIG. 4 is a block diagram illustration of the general topology of a parallel converter system having a converter system main controller for the power converter and power sharing controller for each power channel in accordance with certain embodiments of the present invention.

FIG. 4 is a block diagram illustration of the general topology of another parallel converter system 200 having a converter system main controller 210 for each individual channel parallel converters in accordance certain embodiments of the present invention. In certain embodiments, the parallel converter system 200 has N parallel power channels 20K, where K=1, 2, . . . , and N.

As shown in FIG. 4, the parallel converter system 200 has: N channel power sharing controllers: a channel 1 power sharing controller 2012, a channel 2 power sharing controller 2022, . . . , and a channel N power sharing controller 20N2, and N channel parallel converters: a channel 1 parallel converter 2014, a channel 2 parallel converter 2024, . . . , and a channel N parallel converter 20N4. Each of the channel power sharing controllers is coupled to a corresponding channel parallel converter.

In certain embodiments, each of the channel power sharing controllers provides a channel reference signal $V_{RK}$ to the corresponding channel K parallel converter to control the output of the channel K independently such that the sum of the output current of the parallel converter system is precisely controlled, short circuit currents from the channel parallel converters are limited, and shocks on the parallel converter system caused by the fluctuation of the output current are reduced.

Similar to the parallel converter system 100, in the AC input end, the parallel converter system 200 has N input filter combo units: a channel 1 input filter combo 2016, a channel 2 input filter combo 2026, . . . , and a channel N input filter combo 20N6. Each of the input phase has a filter, where an inductor is coupled in serial and a capacitor is coupled in parallel to stabilize the impedance of the corresponding input phase. In the AC output end, the parallel converter system 200 has N output filter combo units: a channel 1 output filter combo 2018, a channel 2 output filter combo 2028, . . . , and a channel N output filter combo 20N8. Each of the output phase also has a filter, where an inductor is coupled in serial and a capacitor is coupled in parallel to smooth out the output AC waveform of the corresponding output phase.

In certain embodiments, as shown in FIG. 4, the parallel converter system 200 has a converter system main controller 210. The converter system main controller 210 control signal output forms the main component of each channel's reference voltage. The output of 210 gets further modified by the converter load sharing voltage trimming controller output $V_{TK}$ in the channel's power sharing controllers. Each converter load sharing voltage trimming controller is responsive to the current measurement of the channel it is controlling. The channel power sharing controller receives the net converter output reference current $I_{ref,dq}$ along the d and q axis representing the reactive and active components respectively and channel participating factors $P_K$ dictating the participation of the channel in the net output. Note that the participation of channel J in the output current would be the proportion $$\frac{P_J}{\Sigma_1^N P_K} \times I_{ref,dq}$$

and 1≤J≤N.

Figure 5:
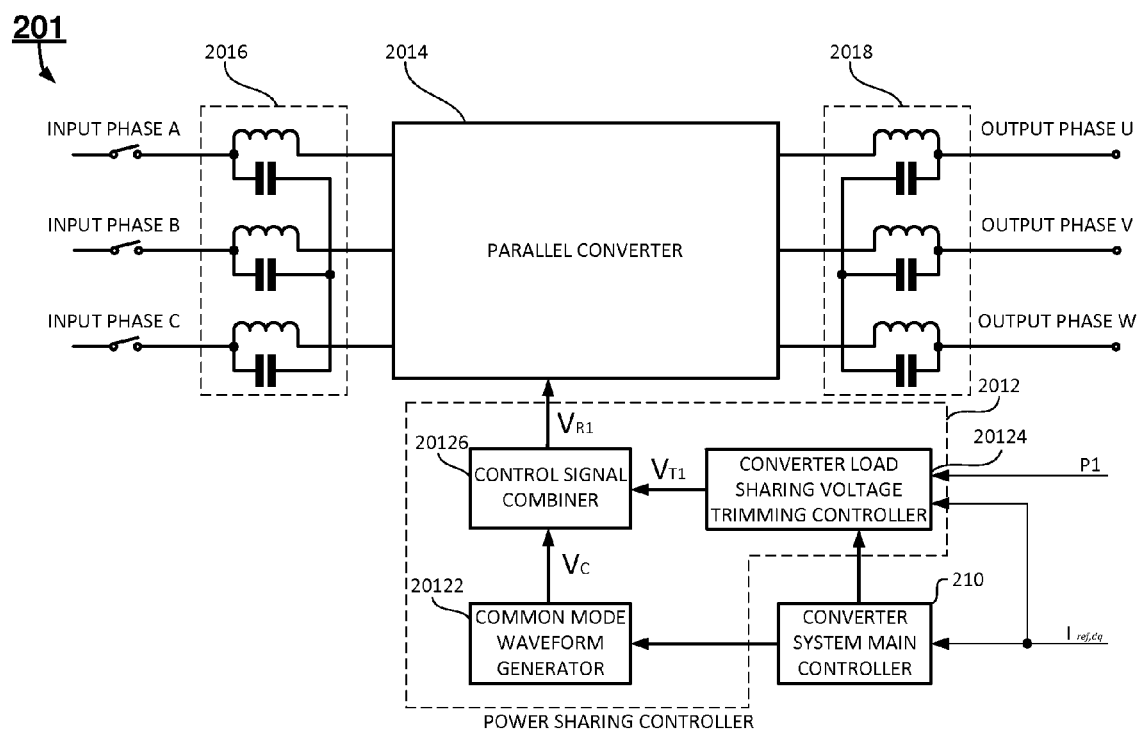
FIG. 5 is a detailed block diagram illustration of the channel one of the parallel converter system with the converter system main controller in which embodiments of the present invention can be practiced.

FIG. 5 is a detailed block diagram illustration of the channel 1 parallel converter 201 of the parallel converter system 200 with the converter system main controller 210 in which embodiments of the present invention can be practiced. In certain embodiments, the channel 1 power sharing controller 2012 has a common mode waveform generator 20122, a converter load sharing voltage trimming controller 20124, and a control signal combiner 20126. As shown in FIG. 5, the converter system main controller 210 output is used to generate the common mode waveform and is modified to form the output reference waveform in each of the channel K power sharing controllers.

The control signal combiner 20126 receives the input voltage $V_{T1}$ from the converter load sharing voltage trimming controller 20124, and the channel common mode waveform signal $V_C$ from the common mode waveform generator 20122, and combines the input voltage $V_{T1}$ from the converter load sharing voltage trimming controller 20124 and the channel common mode waveform signal $V_C$ from the common mode waveform generator 20122 to generate the channel 1 reference signal $V_{R1}$.

Other channels of parallel converter system 200 are operated in a similar manner except that the control signal combiner of channel K 20K26 receives the input voltage $V_{TK}$ from the corresponding channel K converter load sharing voltage trimming controller 20K24. The channel K reference signal $V_{RK}$ is the combination of $V_{TK}$ and $V_C$.

In certain embodiments, each of the channel reference signals $V_{RK}$, where K=1, 2, ..., and N, is user programmable via the common mode waveform generator 20122 and the converter load sharing voltage trimming controller 20124.

Figure 6:
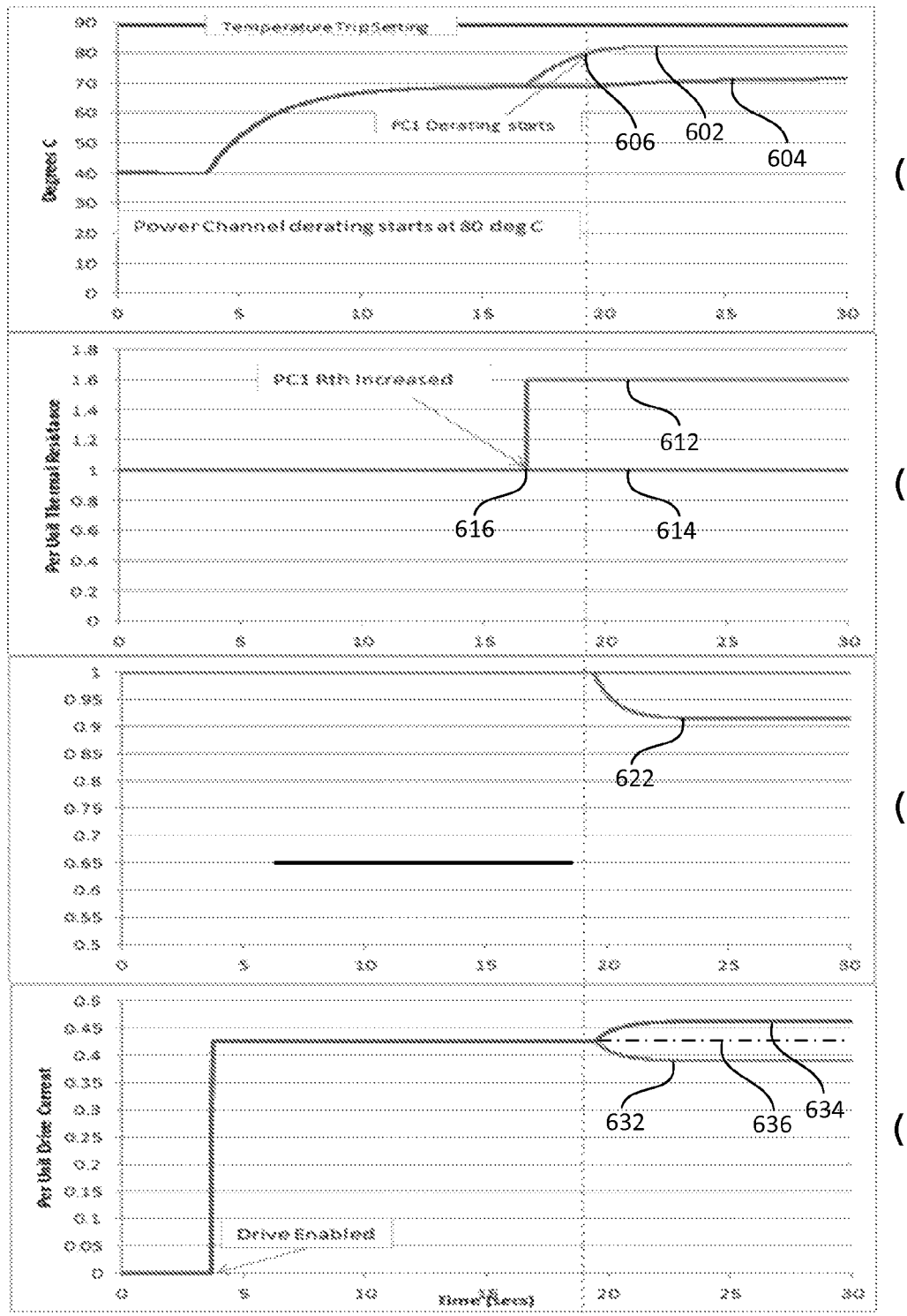
FIG. 6 illustrates an exemplary usage of channel participation factors to attain partial de-rating of a power channel among two parallel channels according to one embodiment of the present invention.

Referring now to FIG. 6, an exemplary usage of channel participation factors to attain partial de-rating of a power channel among two parallel channels is shown according to one embodiment of the present invention. In the case shown, a drive is enabled with full cooling capability available at both channels: power channel 1 (PC1), and power channel 2 (PC2), as shown in FIG. 6D. The exit air temperature of both power channels rises together and settles to final value as shown in FIG. 6A. A change 616 as shown in FIG. 6B in thermal resistance of PC1, for example, cooling fan speed reduction or fan filter being clogged, causes the thermal resistance of PC1 612 increases, while the thermal resistance of PC2 614 remain unchanged. The exit air temperature of PC1 602 to increase as shown in FIG. 6A, while the exit air temperature of PC2 remain unchanged as shown as 604 in FIG. 6A. The drive is set to start de-rating of PC1 606 when the exit air temperature of PC1 reaches 80° C., and the channel is set to trip at exit air temperature at 90° C., When the exit air temperature of PC1 reaches 80° C., the PC1 is de-rated and the participation factor of PC1 622 started to drop after the de-rating of PC1, and the participation factor of PC2 remain unchanged as shown in FIG. 6C. The controller of the parallel converter system makes adjustment such that the output current of PC1 632 is reduced and the output current of PC2 634 is increased the same amount as the decrease of the output current of PC1 so that the overall output current 636 remains the same as shown in FIG. 6D. This allows the temperature of PC1 to settle below the temperature trip setting and prevents a trip of the parallel converter system.

In another aspect, the present invention relates to a method for controlling operation of a parallel converter system. In certain embodiments, the parallel converter system includes multiple channel parallel converters, and each of the channel parallel converters is coupled to a corresponding channel power sharing controller. The method includes:
   generating, via each of the channel power sharing controllers, a channel reference signal for each of the corresponding channel parallel converters for controlling the output current of each of the corresponding channel parallel converters, respectively;
   transmitting, via each of the channel power sharing controllers, the generated channel reference signal to each of the corresponding channel parallel converters;
   receiving, at each of the channel parallel converters, the channel reference signal from each of the corresponding channel power sharing controllers; and
   controlling the output current of each of the corresponding channel parallel converters, in response to the channel reference signals received via each of the channel parallel converters such that the sum of the output current of the parallel converter system is precisely controlled, short circuit currents from the channel parallel converters are limited, and shocks on the parallel converter system caused by the fluctuation of the output current are reduced.

The operation of generating channel reference signals is accomplished by at least following two methods.

In one embodiment as shown in FIGS. 2 and 3, a parallel converter system 100 has N channel individual controllers: a channel 1 individual controller 1011, a channel 2 individual controller 1021, ..., and a channel N individual controller 10N1. Each of the channel individual controllers is coupled to each of the channel power sharing controllers. Each of the channel power sharing controllers receives input voltages from each of the channel individual controllers. Each of the input voltages from the channel individual controller is responsive to the current measurement of each of the channel parallel converters.

In certain embodiments, each of the channel K power sharing controller 10K2, where K=1, 2, ..., and N, has an average voltage waveform generator 10K22, a common mode waveform generator 10K24, and a control signal combiner 10K26. Each of the average voltage waveform generator 10K22 receives the input voltages from each of the N channel individual controllers and generates a channel average voltage waveform signal in response to the input voltages received. Each of the common mode waveform generator 10K24 receives the channel average voltage waveform signal and generates a channel common mode waveform signal $V_C$ according to the channel average voltage waveform signal received.

Each of the control signal combiners 10K26 receives an input voltage $V_{IK}$ ((individual voltage K) from the channel K individual controllers 10K1, and the channel common mode waveform signal $V_C$ from each of the common mode waveform generators 10K24, and combines the input voltage $V_{IK}$ from the channel K individual controller and the channel common mode waveform signal $V_C$ from the common mode waveform generator 10K24 to generate the channel K reference signal $V_{RK}$. The channel K reference signal $V_{RK}$ is the combination of $V_{TK}$ and $V_C$.

In another embodiment as shown in FIGS. 4 and 5, a parallel converter system 200 has a converter system main controller 210. The converter system main controller 210 has multiple channel control signal outputs. Each of the channel control signal outputs is coupled a corresponding channel power sharing controllers. Each of the channel power sharing controllers receives a channel control signal from a corresponding channel control signal output, and each of the channel control signal outputs is responsive to the current measurement of each of the channel parallel converters.

In certain embodiments, the channel K power sharing controller 20K2, where K=1, 2, . . . , and N, has a common mode waveform generator 20K22, a converter load sharing voltage trimming controller 20K24, and a control signal combiner 20K26. As shown in FIG. 5, the converter system main controller 210 has two outputs to each of the channel K power sharing controllers.

Each of control signal combiners 20K26 receives the input voltages VTK from the converter load sharing voltage trimming controller 20K24, and the channel common mode waveform signal $V_C$ from the common mode waveform generator 20K22, and combines the input voltage $V_{TK}$ from the converter load sharing voltage trimming controller 20K24 and the channel common mode waveform signal $V_C$ from the common mode waveform generator 20K22 to generate the channel K reference signal $V_{RK}$. The channel K reference signal $V_{RK}$ is the combination of $V_{TK}$ and $V_C$.

In yet another aspect, the present invention relates to a computer readable media storing computer executable instructions. When these computer executable instructions are executed by one or more processors of a parallel converter system, these computer executable instructions are adapted to control operation of the parallel converter system. The parallel converter system has multiple channel parallel converters, and each of the channel parallel converters is coupled to a corresponding channel power sharing controller. The method of controlling the operation of the parallel converter system includes:

generating, via each of the channel power sharing controllers, a channel reference signal for each of the corresponding channel parallel converters for controlling the output current of each of the corresponding channel parallel converters, respectively;

transmitting, via each of the channel power sharing controllers, the generated channel reference signal to each of the corresponding channel parallel converters;

receiving, at each of the channel parallel converters, the channel reference signal from each of the corresponding channel power sharing controllers; and controlling the output current of each of the corresponding channel parallel converters, in response to the channel reference signals received via each of the channel parallel converters such that the sum of the output current of the parallel converter system is precisely controlled, short circuit currents from the channel parallel converters are limited, and shocks on the parallel converter system caused by the fluctuation of the output current are reduced.

The operation of generating channel reference signals is accomplished by similar methods described in earlier sections, and will not be repeated here.

CONCLUSION

The foregoing description of the exemplary embodiments of the disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present disclosure pertains without departing from its spirit and scope. For example, multiple probes may be utilized at the same time to practice the present disclosure. Accordingly, the scope of the present disclosure is defined by the appended claims rather than the foregoing description and the exemplary embodiments described therein.

What is claimed is:

1. A method for controlling operation of a parallel converter system including a plurality of parallel converters, each being coupleable to a controller, the method comprising:

generating, via each of the controllers, a channel reference signal, wherein the generated channel reference signal is responsive to a participation factor of the parallel converter of the corresponding channel, and a net converter output reference current;

transmitting each of the generated channel reference signals to a corresponding one of the parallel converters; and adjusting an output current of each of the parallel converters responsive to the corresponding channel reference signals received, the adjusting controlling a combined output current of the parallel converter system; and wherein the controller is a power sharing controller comprising:

an average voltage waveform generator configured to generate an average voltage signal in response to the input voltages received from each of the individual controllers;

a common mode waveform generator configured to generate a common mode waveform signal in responses to the average voltage signal generated; and a signal combiner configured to combine the input voltage from the individual controller and the common mode waveform signal to generate the channel reference signal;

wherein each of the power sharing controller receives a channel participation factor $P_K$ of the channel K, where K=1, 2, . . . , and N, and a reference current $I_{ref,dq}$, wherein the reference current $I_{ref,dq}$ represents the net converter output reference current along the d and q axis representing the reactive and active components of the output current, respectively, and the channel participation factor $P_K$ of the channel K represents the channel K's proportion of the overall power output of the parallel converter system; and wherein each of the plurality of parallel converters comprises:
an active front end (AFE) converter power module configured to convert AC inputs to DC outputs;
an inverter power module configured to convert the DC outputs from the AFE converter power module to AC outputs;
a modulator configured to receive the channel reference signal and control the AFE converter power module and the inverter power module in response to the channel reference signal received;

wherein the parallel converter system further comprises a plurality of individual controllers, each being coupleable to a corresponding power sharing controller to receive input voltages from each of the individual controllers.

2. The method of claim 1, wherein the parallel converter system further comprises a converter system main controller having a plurality of control signal outputs, each being coupleable to a corresponding power sharing controller, and each being responsive to a current measurement of each of the corresponding parallel converters.

3. The method of claim 2, wherein each of the power sharing controllers comprises:
a common mode waveform generator configured to generate a common mode waveform signal in response to the control signals received from the converter system main controller;
a converter load sharing voltage trimming controller configured to generate a load sharing trimming signal in response to the control signal received; from the converter system main controller; and
a signal combiner configured to combine the load sharing trimming signal and the common mode waveform signal to generate the channel reference signal;

wherein each of the power sharing controller receives a control signal from a corresponding control signal output, and each being responsive to a current measurement of each of the corresponding parallel converters, a channel participation factor $P_K$ of a corresponding channel K, where K=1, 2, . . . , and N, and a reference current $I_{ref,dq}$ wherein the reference current $I_{ref,dq}$ represents the net converter output reference current along the d and q axis representing the reactive and active components of the output current, respectively, and the channel participation factor $P_K$ of the channel K represents the channel K's proportion of the overall power output of the parallel converter system.

4. A computer readable media storing computer executable instructions wherein said instructions when executed are adapted to control operation of a parallel converter system including a plurality of parallel converters, each being coupleable to a corresponding controller, with a method comprising:
generating, via each of the controllers, a channel reference signal, wherein the generated channel reference signal is responsive to a participation factor of the parallel converter, and a net converter output reference current;
transmitting each of the generated channel reference signals to a corresponding one of the parallel converters; and
adjusting an output current of each of the parallel converters responsive to the corresponding channel reference signals received, the adjusting controlling a combined output current of the parallel converter system;

wherein the controller is a power sharing controller comprising:
an average voltage waveform generator configured to generate an average voltage signal in response to the input voltages received from each of the individual controllers;
a common mode waveform generator configured to generate a common mode waveform signal in responses to the average voltage signal generated; and
a signal combiner configured to combine the input voltage from the individual controller and the common mode waveform signal to generate the channel reference signal;
wherein each of the power sharing controller receives a channel participation factor $P_K$ of the channel K, where K=1, 2, . . . , and N, and a reference current $I_{ref,dq}$, wherein the reference current $I_{ref,dq}$ represents the net converter output reference current along the d and q axis representing the reactive and active components of the output current, respectively, and the channel participation factor $P_K$ of the channel K represents the channel K's proportion of the overall power output of the parallel converter system; and wherein each of the plurality of parallel converters comprises:
an active front end (AFE) converter power module configured to convert AC inputs to DC outputs;
an inverter power module configured to convert the DC outputs from the AFE converter power module to AC outputs;
a modulator configured to receive the channel reference signal and control the AFE converter power module and the inverter power module in response to the channel reference signal received;
wherein the parallel converter system further comprises a plurality of individual controllers, each being coupleable to a corresponding power sharing controller to receive input voltages from each of the individual controllers.

5. The computer readable media of claim 4, wherein the parallel converter system further comprises a converter system main controller having a plurality of control signal outputs, each being coupleable to a corresponding power sharing controller to receive a control signal from a corresponding control signal output, and each being responsive to a current measurement of each of the corresponding parallel converters.

6. The computer readable media of claim 5, wherein each of the power sharing controllers comprises:
a common mode waveform generator configured to generate a common mode waveform signal in response to the control signals received from the converter system main controller;
a converter load sharing voltage trimming controller configured to generate a load sharing trimming signal in response to the control signal received; from the converter system main controller; and
a signal combiner configured to combine the load sharing trimming signal and the common mode waveform signal to generate the channel reference signal;
wherein each of the power sharing controller receives a control signal from a corresponding control signal output, and each being responsive to a current measurement of each of the corresponding parallel converters, a channel participation factor PK of a corresponding channel K, where K=1, 2, . . . , and N, and a reference current $I_{ref,dg}$ wherein the reference current $I_{ref,dq}$ represents the net converter output reference current along the d and q axis representing the reactive and active components of the output current, respectively, and the channel participation factor $P_K$ of the channel K represents the channel K's proportion of the overall power output of the parallel converter system.

7. A parallel converter system comprising:
a plurality of parallel converters; and
a plurality of controllers, each being coupleable to a corresponding parallel converter;
wherein each of the controllers provides a channel reference signal to its corresponding parallel converter to adjust the output current independently such that a combined output current of the parallel converter system is controlled, wherein the channel reference signal is responsive to a participation factor of the parallel converter, and a net converter output reference current
wherein the controller is a power sharing controller comprising:
an average voltage waveform generator configured to generate an average voltage signal in response to the input voltages received from each of the individual controllers;
a common mode waveform generator configured to generate a common mode waveform signal in responses to the average voltage signal generated; and
a signal combiner configured to combine the input voltage from the individual controller and the common mode waveform signal to generate the channel reference signal;
wherein each of the power sharing controller receives a channel participation factor $P_K$ of the channel K, where K=1, 2, . . . , and N, and a reference current $I_{ref,dq}$, wherein the reference current $I_{ref,dq}$ represents the net converter output reference current along the d and q axis representing the reactive and active components of the output current, respectively, and the channel participation factor $P_K$ of the channel K represents the channel K's proportion of the overall power output of the parallel converter system; and
wherein each of the plurality of parallel converters comprises:
an active front end (AFE) converter power module configured to convert AC inputs to DC outputs;
an inverter power module configured to convert the DC outputs from the AFE converter power module to AC outputs;
a modulator configured to receive the channel reference signal and control the AFE converter power module and the inverter power module in response to the channel reference signal received;
wherein the parallel converter system further comprises a plurality of individual controllers, each being coupleable to a corresponding power sharing controller to receive input voltages from each of the individual controllers.

8. The system of claim 7, wherein each of the channel reference signals is user programmable via the common mode waveform generator and the average voltage waveform generator.

9. The parallel converter system of claim 7, further comprising a converter system main controller having a plurality of control signal outputs, each being coupleable to a corresponding power sharing controller to receive a control signal from a corresponding control signal output, and each being responsive to a current measurement of each of the corresponding parallel converters.

10. The parallel converter system of claim 9, wherein each of the power sharing controllers comprises:
a common mode waveform generator configured to generate a common mode waveform signal in response to the control signals received from the converter system main controller;
a converter load sharing voltage trimming controller configured to generate a load sharing trimming signal in response to the control signal received from the converter system main controller and a channel participation factor $P_K$ of the channel K, where K=1, 2, . . . , and N; and
a signal combiner configured to combine the load sharing trimming signal and the common mode waveform signal to generate the channel reference signal;
wherein each of the power sharing controller receives the channel participation factor $P_K$ of the channel K, and a reference current $I_{ref,dg}$, wherein the reference current $I_{ref,dq}$ represents the net converter output reference current along the d and q axis representing the reactive and active components of the output current, respectively, and the channel participation factor $P_K$ of the channel K represents the channel K's proportion of the overall power output of the parallel converter system.

11. The system of claim 10, wherein each of the channel reference signals is user programmable via the common mode waveform generator and the converter load sharing voltage trimming controller.

* * * * *